United States Patent [19]

Peterson

[11] Patent Number: 4,857,968
[45] Date of Patent: Aug. 15, 1989

[54] APPARATUS, METHODS AND ARTICLES FOR INTERNEGATIVE COLOR BALANCING

[76] Inventor: Glen Peterson, 15 Midland Ave., Bronxville, N.Y. 10708

[21] Appl. No.: 83,232

[22] Filed: Aug. 6, 1987

[51] Int. Cl.$^4$ .............................................. G03B 27/58
[52] U.S. Cl. ......................................... 355/72; 355/74
[58] Field of Search .................................... 355/72, 74

[56] References Cited

U.S. PATENT DOCUMENTS

| | | | |
|---|---|---|---|
| 2,219,703 | 10/1940 | Spencer | 355/74 |
| 2,253,231 | 8/1941 | Friedell . | |
| 2,605,675 | 8/1952 | Mourfield | 355/74 |
| 3,418,049 | 12/1968 | Whitlatch | 355/74 |
| 3,529,519 | 9/1970 | Mitchell . | |
| 3,552,288 | 1/1971 | Corley . | |
| 3,718,397 | 2/1973 | Smajo . | |
| 3,728,021 | 4/1973 | Retzyl et al. | 355/74 |
| 3,853,564 | 12/1974 | Baker . | |
| 4,003,654 | 1/1977 | Smolen | 355/74 |
| 4,047,817 | 9/1977 | Enomoto . | |
| 4,095,892 | 6/1978 | Thornton | 355/74 |
| 4,167,327 | 9/1979 | DiNatale . | |
| 4,190,356 | 2/1980 | Knapp | 355/74 |
| 4,211,558 | 7/1980 | Oguchi et al. . | |
| 4,225,223 | 9/1980 | Papadakis | 355/74 |
| 4,257,702 | 3/1981 | Miller | 355/72 |
| 4,310,248 | 1/1982 | Meredith . | |
| 4,422,759 | 12/1983 | Holman et al. . | |
| 4,452,529 | 6/1984 | Olsson | 355/72 |
| 4,508,686 | 4/1985 | Shaber et al. . | |
| 4,523,852 | 6/1985 | Bauer . | |
| 4,588,298 | 5/1986 | Nakamura . | |
| 4,603,967 | 8/1986 | Virtanen | 355/74 |

OTHER PUBLICATIONS

"Color Balancing Internegs" by Tim Hall, *Photo Lab Management*, Mar. 1987, pp. 20, 31, 39.
Literature and Price List of "Photographic Software" Relating to 'P.S. One' Color Balancing System (12 pages), 1986.
Article entitled: "Software For Color-Balancing Internegatives", by Bruce A. Schon, (4 pages), Reprinted from Photographic Processing, Jul. 1986.
Eastman Kodak Company Publication E-24S Entitled: "Balancing Kodak Vericolor Internegative Films 4112," pp. 1-19, 21, 23, 1984.
Eastman Kodak Company Publication E-24T Entitled: "Balancing Kodak Vericolor Internegative Film 4114," pp. 1-17, 29, 20, 1984.

Primary Examiner—Monroe H. Hayes
Attorney, Agent, or Firm—Neuman, Williams, Anderson & Olson

[57] ABSTRACT

A section of film forms a gray scale having a series of portions forming steps with progressively changing densities and is supported below an opening in a top wall of an enclosure with an internegative being supported therebelow, the internegative being movable to allow sequential exposure of a series of separate portions thereof, while using different color selected filtrations. The gray scale and the number and relation of the exposure positions are such that the internegative is used to a maximum extent and such that a color balance is readily seen from a visual examination of the developed internegative.

8 Claims, 8 Drawing Sheets

APPARATUS, METHODS AND ARTICLES FOR INTERNEGATIVE COLOR BALANCING

This invention relates to the processing of internegatives and more particularly to apparatus, methods and articles usable in the easy production of internegatives in a manner such as to obtain optimum color balancing and to consistently produce color photographic reproductions of very high quality. With the invention, procedures are greatly simplified, requiring much less time and obtaining much more accurate control. The invention frees the photographer to make maximum use of his or her visual and artistic skills and judgment and to easily, quickly and efficiently produce the desired results.

BACKGROUND OF THE INVENTION

Internegatives are used in producing high quality color prints from transparencies. For example, an enlarger may be used to project an image from a 35 mm color transparency through selected color filters and onto a 8×10-inch internegative and, after developing the internegative, a contact print or enlargement may be made therefrom. The results obtained are dependent, in part, upon the filtration given to the internegative as well as subsequent color adjustments of color filters used to make the color print or enlargement. Resulting color is also dependent, in part, upon the color response characteristics of internegatives which are variable, being affected by variations in the conditions of storage and handling to which the internegatives have been subjected and also by variations in the materials and processes used in manufacture of the internegatives. In an attempt to compensate for such variations, frequent tests are mandatory and various color balancing methods have been used.

The aim is to secure a good neutral scale on the final color print, showing a wide range of neutrals from light tone values to darkest values. The standard recommendation is that empirical methods of testing be performed by exposing through silver gray scale tablets. Using conventional methods, the testing may consume days of experiment and laborious readings of internegative steps through red, green and blue filters. In a plot method, such readings are plotted on graph paper to see if all three color readings "track together" and to see that no "humps" occur in center scale.

Nearly two hours is required for developing an internegative and making a color print therefrom and a number of exposures are oftentimes necessary, especially when the filtration values initially selected are quite different from the optimum values. Making a print may not be necessary if a VCNA (Video Color Negative Analyzer) is available to be used to directly analyze an internegative. However, a considerable amount of time must still be spent since developing of an internegative may require an hour or more and in many cases a print will be required even when a VCNA is available.

Standard gray scales used in the empirical methods are black-and-white silver images in the form of a series of eleven or twenty-one contiguous rectangular "steps" of progressively different densities. In the eleven-step gray scale, the density difference between consecutive steps is 0.30 which is equivalent to 0.30 log E or one lens step. In the twenty-one step gray scale, the density difference between consecutive steps is 0.15.

In a plot method as aforementioned, the red, green and blue densities of the reproduced steps may be measured and plotted to produce curves for comparison with empirical data set forth in standard curves to determine what changes in color filtration may be required. In an alternative two-point procedure, which is less accurate but which requires less time, the color densities of two steps are measured and the differences therebetween are determined. Then filter changes and exposure changes are determined from reference to empirical data in look-up tables. Another method is similar to the plot method but uses a computer and a gray scale having an emulsion similar to that of the film to be balanced. The computer is programmed for entry of data from densitometer readings and compares such data with stored empirical data to compute recommended filtration data, the entered and computed data being stored for future reference.

These methods require that the photographer spend a considerable amount of time in carrying out densitometer measurements and other specified procedures and there is a possibility for measuring, entry, computational or other error. Even without any such errors, the results obtained are not reliable. The recommended procedures can be carried out with meticulous care, but it will be found that more often than not, the final prints obtained will not be entirely satisfactory and that it is necessary to take the time required for repeat procedures and make one or more changes in the filtration values if truly high quality prints are to be obtained.

The difficulties with the prior art methods are indicated by consideration of information pamphlets supplied by Eastman Kodak Company, describing in detail the laborious procedures necessary for performance of the methods. The pamphlet recommends that after obtaining the best color balance possible with an empirical method as described, the photographer should "Select a good transparency with visually sensitive areas such as flesh or concrete and neutral objects with a wide range of densities. Make the best print possible from this internegative. In this case, it is recommended that you make your final judgment from the scene content rather than the reproduction of the step tablet. Often, the best print for flesh will produce a slightly cyan or blue reproduction of the silver step tablet." (underlined portion in italics in original)

These problems with the prior art methods are exacerbated by the fact that the color balancing procedures should always be repeated when internegatives are to be used which are not from the same batch as manufactured and should also be repeated periodically even when from the same batch, since the characteristics of the film as well as processing can change with time. One result is that low quality products are frequently passed as being acceptable in order to avoid the time, expense and frustrations of trying to produce a high quality product.

SUMMARY OF THE INVENTION

This invention was evolved with the general object of avoiding the problems and frustrations of the prior art and of consistently obtaining a highly accurate color balance in products obtained from internegative processing while spending much less time and effort in doing so.

An important aspect of the invention relates to a recognition that the true objective of internegative processing relates to visual appearance. After years of a frustrating experience with the prior art methods and trying to find a solution, and it came to me, when considering the above-quoted portion of the Eastman Kodak pamphlet, that the true objective of color balancing of internegatives is to consistently make final reproductions which achieve the visual impression of an accurate color balance. It also became apparent to me that the empirical methods of the prior art are not designed to directly achieve this objective and I also came to a recognition of the reasons why they fail to do so. It is now apparent that what the prior art methods are designed to do is to achieve a certain empirical relationship which does not necessarily produce the desired results but does achieve a certain degree of uniformity in that if rigorously followed, all persons using the methods would obtain the same results, even though not perfect.

However, the achievement of repeatable results does not insure the desired true objective because of the variables which are not taken into account. For example, the black-and-white silver film used to make the conventional gray scale does not have the same spectral characteristics as a color film. Also, a single test of a single gray scale of any form, even with density readings on each of 21 steps, does not provide enough data to insure accurate determination of the required filtration, and the results may be quite inaccurate when the filtration values used in the test differ substantially from the optimum values. As hereinafter described, twelve variations of filter combinations are produced on one sheet of film with the invention to obtain twelve different color variables and to save time and materials.

Another very important aspect of the invention is in the recognition of the capabilities of the human eye in distinguishing slight differences in hue and intensity and of the possibility of presenting information to the eye in a manner such that efficient use of such capabilities can be made to obtain the desired objective. Such capabilities are not used in the prior empirical methods in which the photographer is directed to make only specified densitometer measurements and computations, and to go through tedious procedures in referring to look-up tables, plotting of values and/or making computer entries.

In accordance with important features of the invention, a gray scale of a certain form and size is provided and exposures of several separate portions of a single internegative are effected through the gray scale, using a series of progressively different color filtrations. The gray scale is a color film of the same type as the transparencies to be processed and it is on 35 mm. film with a length of about 4¾ inches with twelve portions of a 8×10 inch internegative being exposed to the gray scale in sequence, using twelve progressively different color filtrations. After exposure, the internegative is developed and tests are made with respect to the twelve exposed portions to determine which of the progressively different color filtrations is closest to that producing the desired color balance. The twelve progressively different color filtrations are preferably such that the expected color balance will be within the range thereof and, if not obtained by one of the selected filtrations, will fall between two filtrations which are close together so as to permit accurate determination. If none are acceptable, a proper color direction will nevertheless be indicated.

Densitometer tests may be made on the internegative to determine color balance but very important features of the invention relate to visual testing of a print developed from the internegative to quickly obtain highly accurate results and avoid the need for densitometer measurements. From a visual examination of a print, the photographer can quickly determine which of the several selected color filtrations will come closest to producing a visual impression of a color balance, indicated by a shades of gray, with no color, along the length of the reproduced gray scale.

The results of the visual examination provide an especially accurate determination when the gray scale is on color film of the same type as that to be processed and, in accordance with a specific feature of the invention, the gray scale is of a form such as to enhance the amount and accuracy of information obtained from the visual examination. As aforementioned, the density difference between consecutive steps of a standard gray scale reflects a fixed ratio, being equivalent to one-half of a lens stop in the case of a twenty-one step scale or one lens stop in the case of an eleven step scale. Such a gray scale may have advantages in the empirical plot and two-point methods of the prior art and in connection with the computer method, but is discovered that a fixed ratio of densities of consecutive steps is not desirable in using the method of the invention, because it does not produce a fixed difference in tone in the print. What happens is that the viewer will observe very little difference in tone between certain steps and a wide difference in tone between other steps. In accordance with the invention, a gray scale is provided in which the density differences between adjacent steps are such as to produce a uniform tonal difference in the print throughout the full range of the steps.

Another feature of the invention relates to the use of a uniform positional relationship between the light source and associated filters and each of the several portions of the internegative exposed through the gray scale, to insure uniform and consistent results. In accordance with this feature, the gray scale is at a fixed position, preferably centered directly under the enlarger head in alignment with its axis, and the internegative is moved from one position to another for sequential exposure of several portions to the gray scale under exactly the same lighting conditions.

Another specific feature relates to the application to an internegative of indicia of filtration values used in each exposure, each set of indicia being preferably applied adjacent the corresponding exposed portion and being reproduced on the print so as to permit quick and accurate determinations.

Further important features of the invention relate to the provision of apparatus which facilitates exposure of the internegative through the gray scale, visual examination of the results obtained on a print and the retention on the print of a record of the filtration values used in each test with the likelihood of errors being minimized. In accordance with the invention, an exposing box is provided which is arranged to be disposed on an enlarger table and which includes a film slot for a gray scale and a holder for receiving an internegative. A door overlies the gray scale holder and is opened for exposure of a portion of an internegative in its holder, the internegative being movable within the box for sequential exposures of six portions along one-half of the internegative. The box is also arranged to receive and hold a record of the filtrations used in the exposures, a record of a special format being provided to facilitate accurate record keeping and to facilitate application of accurate indicia of filtration values to an internegative.

Preferably, and in accordance with a specific feature, the internegative holder is successively moved forward to a next exposing position, and so on, to make six successive exposures on a first half of the internegative. Then the internegative is rotated relative to the holder and put back in the holder after which the holder is again moved successively from one position to another to make another series of six exposures on the second half of the internegative.

A further specific feature relates to the provision of an arrangement for facilitating accurate movement of the internegative holder from one exposing position to the next within the box.

These and other objects, features and advantages of the invention will become more fully apparent from the following detailed description taken in conjunction with the accompanying drawings.

DESCRIPTION OF PREFERRED EMBODIMENTS AND METHODS

Figure 1:
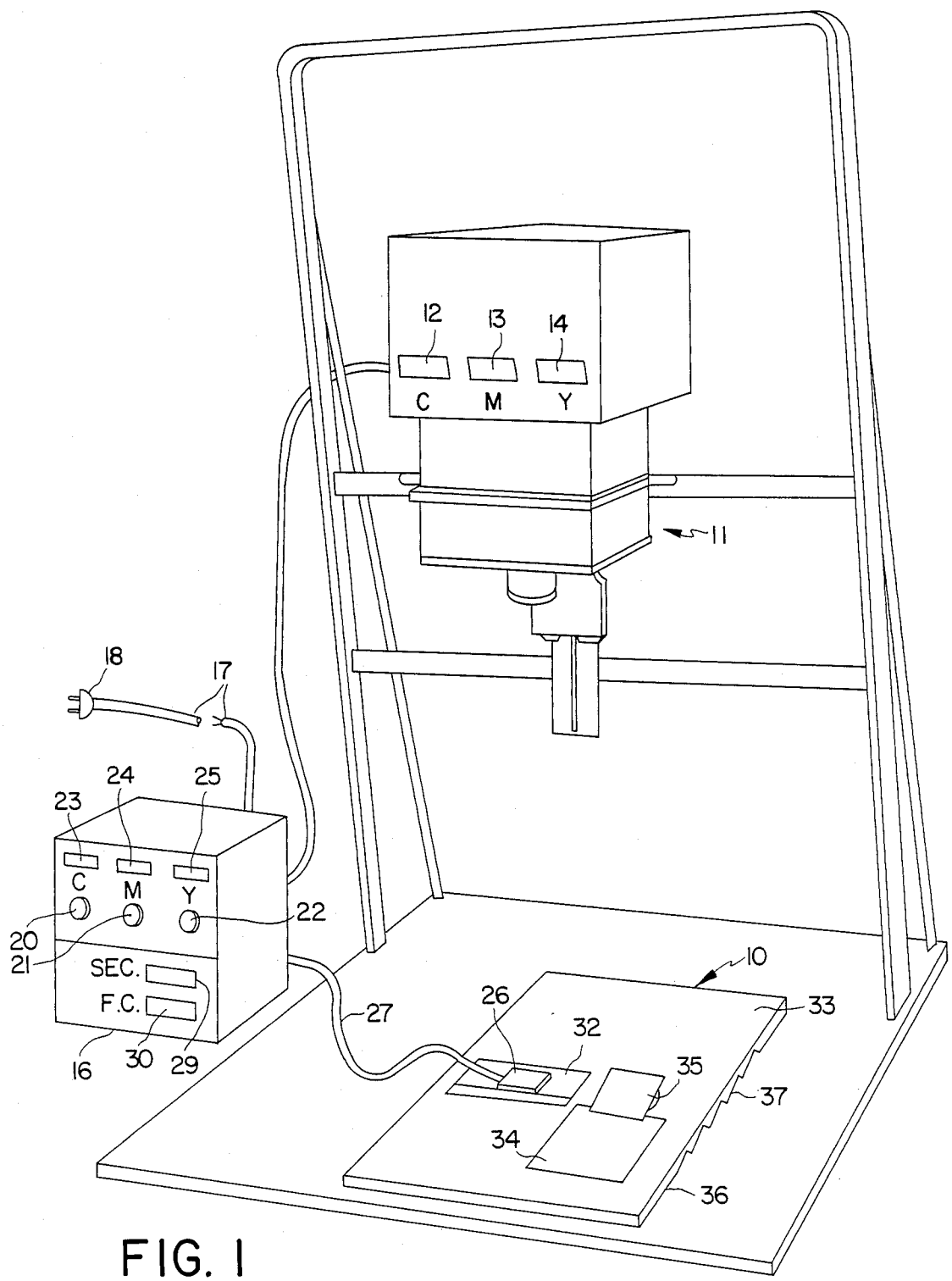
FIG. 1 is a perspective view of an exposure box constructed in accordance with the invention and shown in use in conjunction with enlarger equipment as diagrammatically illustrated.

Reference numeral 10 generally designates an exposure box constructed in accordance with the principles of the invention and arranged for disposition under an enlarger head 11 as diagrammatically illustrated. The illustrated enlarger head 11 includes a conventional light source and also includes cyan, magenta and yellow filters with indicators 12, 13 and 14 connected through a cable 15 to a control unit 16 for control thereof. The control unit 16 is connected through a cord 17 to a plug 18 for connection to a 120 volt AC source. It includes a filter control section with knobs 20, 21 and 22 for control of the cyan, magenta and yellow filters and cyan, magenta and yellow indicators 23, 24 and 25, as shown. The control unit 16 further includes a timer for control of the light source of the head 11 and instrumentation for controlling the intensity of the light at a probe 26 connected thereto through a cable 27. The exposure time setting is indicated by an indicator 29 and the foot candles at the probe 26 are indicated by an indicator 30.

It will be understood that one type of enlarger head and associated control unit are shown to facilitate an explanation of the invention and that the invention may be practiced with other types of enlargers including those designed for operation with conventional filter packs.

The purpose of the exposure box 10 is to permit optimum adjustment of the enlarger head 11, especially the filters thereof, for color balancing of internegatives which are to be subsequently made from film transparencies place in a negative holder of the enlarger.

In the practice of the invention, a test internegative is positioned in the box 10 for exposure of a plurality of portions thereof, with various selected filtration values, through a gray scale having certain characteristics, after which the test internegative is developed and a print is made therefrom. With the box 10 as illustrated, the gray scale is on a strip of 35 mm. film, preferably on the same type of color film as the transparencies to be processed, and twelve portions of an 8×10 inch internegative are exposed through the gray scale under exactly the same exposure conditions except with respect to differences in filtration settings. Provisions are also made for the recording, directly on the internegative, of the type of gray scale used and the filtration values used for each exposed portion, such information being also reproduced on the print.

From visual inspection of the print, the type of filtration required can be quickly determined and no further tests may be required. However, a second internegative may be exposed at a series of filtration values within a narrow range as indicated by the initial test and the required filtration may be determined precisely with a very high degree of accuracy. Density tests may also be made on the internegative, if desired, and recorded for reference and for comparison with the visual results. It is noted that the recording of the type of gray scale and the filtration values used for each exposed portion is highly advantageous in facilitating analysis and adjustment and in providing a record for future reference.

The box 10 includes an exposing door or lid 32 which is carried on a cover 33 and which is positioned over a gray scale inserted in a holder which underlies the door or lid 32. A plan sheet 34 may be placed on the cover 33 with an edge thereof under a spring clip 35. On the side of the box there is a pivoted control and stop member 36 which is arranged to control movement of an internegative holder within the box 10 and which is selectively engageable with one of six stops defined by a serrated member 37.

A user is given instructions to perform a series of operations, such instructions being summarized as follows:

(1) Fill out the plan sheet 34 with twelve different filter combinations to be used in a test. The sample plan sheet 34 may go by increments of 0.05 filter differences and is placed under the clip 35 with a No. 1 exposure at the upper left.

(2) Remove the cover 33 from the box 10 and turn the cover 33 upside down.

(3) Select a gray scale of same type of film which is undergoing the test and insert the selected gray scale into a film slot located in the cover 33 under the door or lid 32.

(4) Turn out the room lights and load a film holder with internegative film, positioning the film with a standard notch thereof at the upper left (the film holder is disposed in a base portion of the box 10, as hereinafter described). Then, put the cover 33 on the box 10, close the door or lid 32, turn on the room lights and pull the control 36 to a position closest to you to bring the internegative holder to a No. 1 exposure position.

(5) Position the box 10 under the enlarger head 11 with the door or lid 32 under the lens center in axial alignment therewith. The box 10 must remain in this exact same location for all twelve exposures.

(6) Set up the filter control knobs 20, 21 and 22 to obtain the exposure No. 1 as previously indicated on the plan sheet 34. For example, the knobs may be set for 0 cyan, 30 magenta and 30 yellow.

(7) Set the timer of the control unit 16 to obtain a ten second exposure which will remain the same for all twelve exposures.

(8) Place the probe 26 over the door or lid 32, turn out the room lights and turn on the enlarger 11. Then adjust the lens diaphragm to show 0.75 foot candles on the meter indicator 30. Remove the probe 26 from the position over the door or lid 32, turn the enlarger off, open the door or lid 32 and turn on the control unit 16 to make the first ten second exposure.

(9) With exposure No. 1 completed, close the door or lid 32, turn on the room lights and move the control and stop member 36 forwardly, away from yourself, to the No. 2 exposure position. Then refer to the test No. 2 filter settings on the plan sheet 34, set the filters, and place the probe 26 on the door or lid 32. Then with the room lights off and the enlarger lamp on, adjust the diaphragm of the enlarger to obtain 0.75 foot candles on the indicator 30. Then again take the probe 26 out of the way, turn the enlarger lamp off, lift the exposure door or lid 32 and make exposure No. 2.

(10) Repeat the foregoing operations until six exposures are made. Only one-half of the film will be exposed. Next, turn out all of tee room lights, remove the cover 33 to obtain access to the internegative film but be careful not to change the box position. Remove the internegative film and rotate to position identity notches at the lower right-hand and then replace the internegative film in its holder in this position. Then bring the exposure toward you to its start position, position No. 1. Then, replace the cover 33, be sure the door or lid 32 is closed and turn on the room lights. Rotate the plan sheet 34 in the same way that you rotated the internegative film, to place exposure No. 7 at an up position at the upper left. Then repeat the foregoing operations to make six additional exposures. When the final No. 12 exposure is finished, turn the room lights off, remove the internegative film, place it in a light-type box and send it for processing.

The user is instructed to then develop the internegative and, after development, to use a silver marker pencil of apply indicia to the developed internegative in adjacent relation to the respective negative gray scale reproductions to identify the filtrations used, the plan sheet 34 being usable to facilitate proper correlation of the gray scale reproductions and filtration values. A print may be made from the developed internegative or, if a VCNA (Video Color Negative Analyzer) is available, it may be used to select the most neutral printing of the twelve exposures which were made. It is very likely that you will have a usable filtration.

If, instead of using the VCNA, a print is made, the indicia of the filtration values will be reproduced in adjacent relation to the respective positive gray scale reproductions. The print may be inspected visually to readily determine which of the selected filtration values comes closest to producing a true color balance, such being obtained when the print from the gray scale is in uniform shades of gray with no color. Generally, of course, the exact color balance will not be obtained at one of the selected values and it will fall between two of the selected values, but the optimum value can be estimated from the appearance of the print and interpolation between the closest filtration values.

Figure 2:
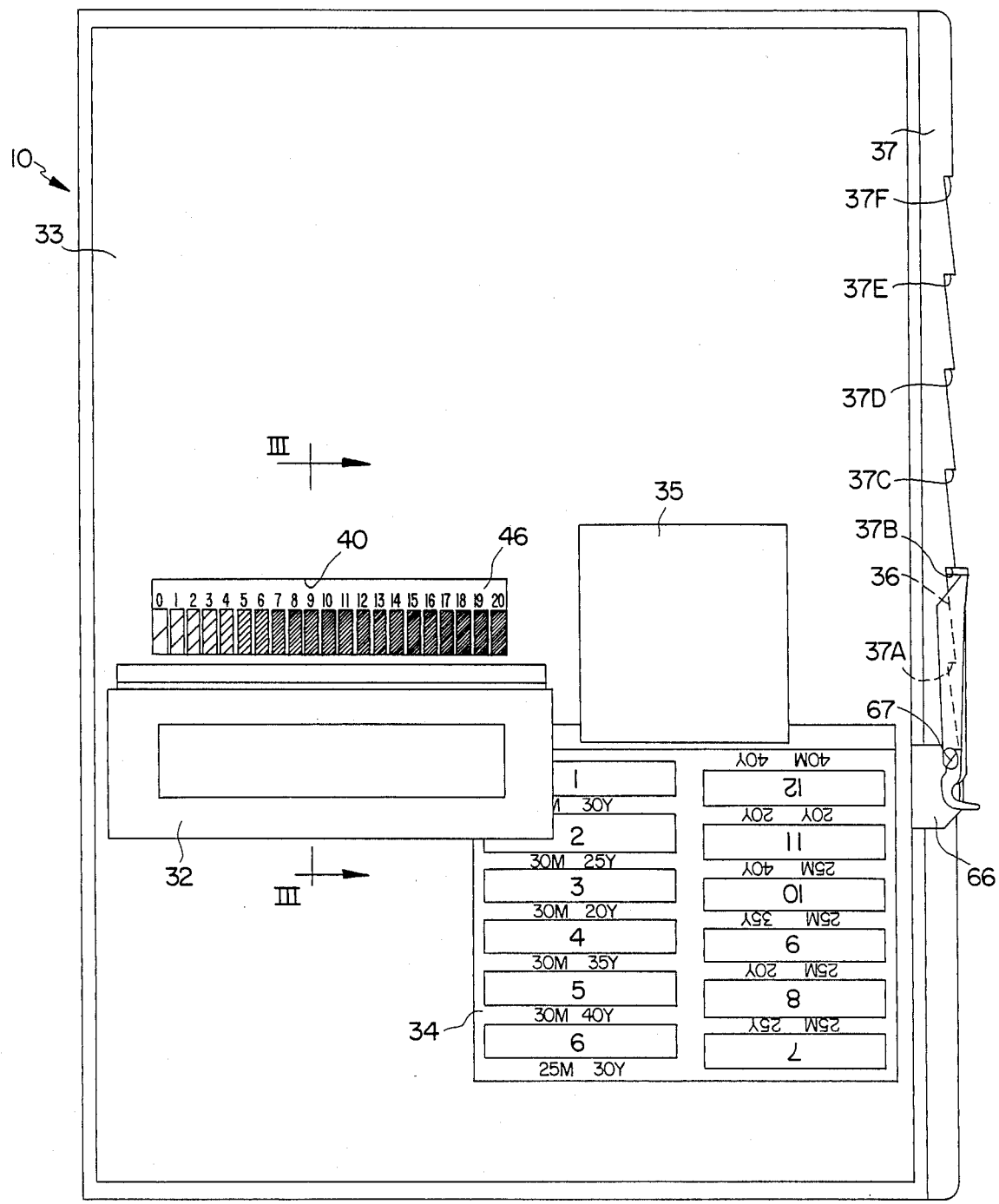
FIG. 2 is a top plan view of a portion of the exposure box of FIG. 1, showing an exposure door in an open position.
Figure 3:
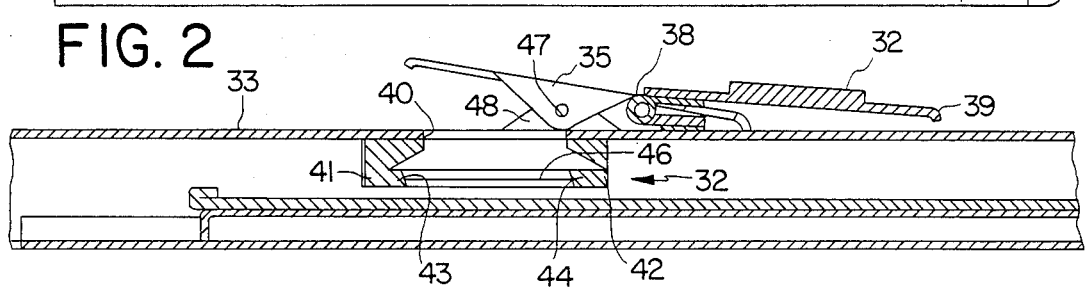
FIG. 3 is a sectional view taken substantially along line III—III of FIG. 2 and on an enlarged scale as compared to that of FIG. 2, showing the cross-sectional configuration of a gray scale holder.

Referring to FIGS. 2 and 3, the door 32 is a rectangular member of sheet material having one edge portion connected to the cover 33 by a hinge 38 and having an opposite edge portion 39 which is turned up to allow it to be easily picked up when in the closed position. The cover 33 has a rectangular opening 40 which registers with the door 32 in its closed position and a gray scale holder 42 is positioned below the opening. Holder 42 includes a pair of spaced parallel elongated members 41 and 42 attached to or integral with the underside of the cover 33 and having facing grooves 43 and 44 which receive edge portions of a gray scale 46 shown positioned in the holder 42.

The clamp 35 as shown is in the form of a member which is pivotal on a pin 47, pin 47 being supported by a suitable bracket 48, with a coiled spring, not shown, being disposed on the pin 47 to urge the clamp to a position as shown in tight engagement with the plan sheet 34.

Figure 4:
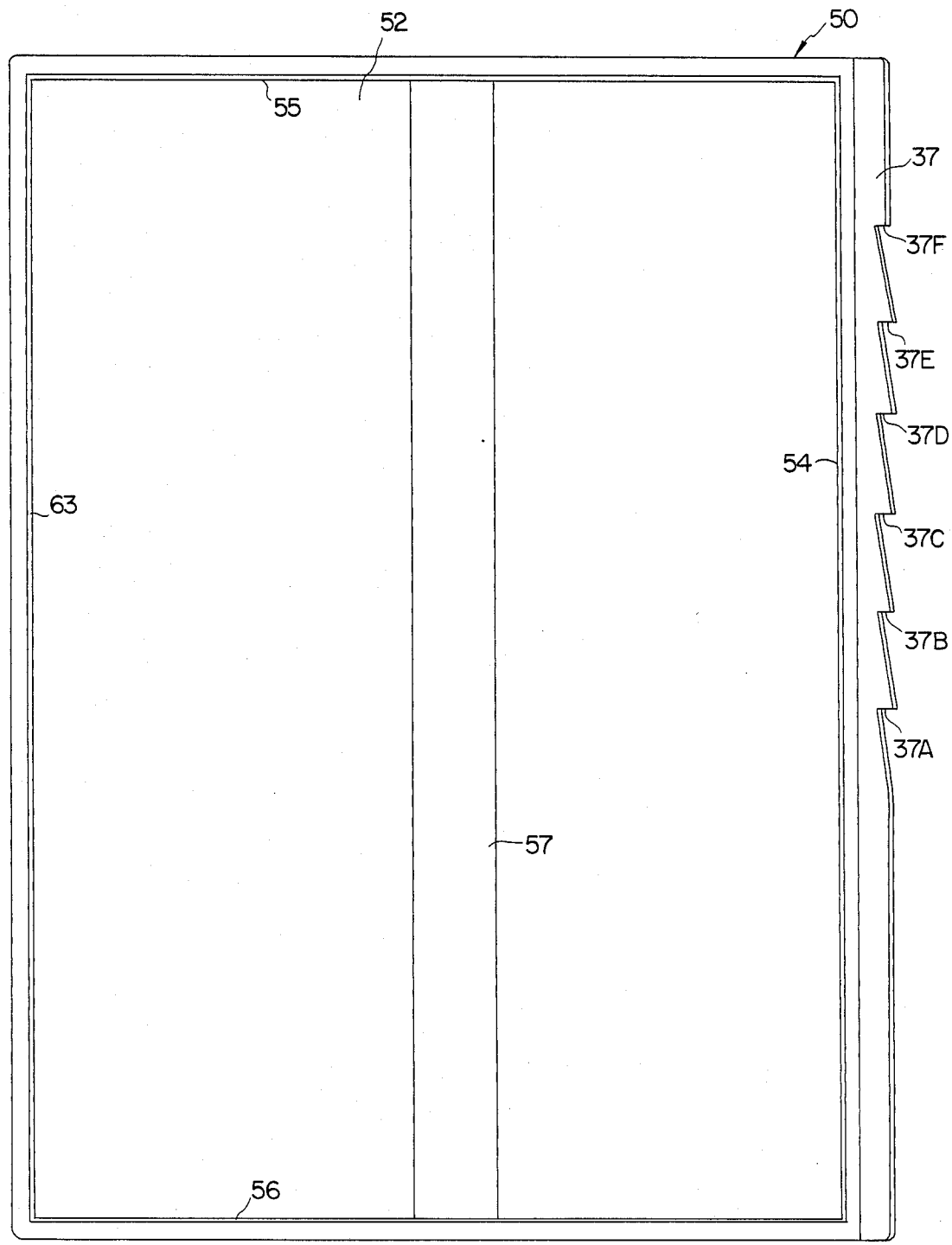
FIG. 4 is a top plan view of a base or bottom portion of the exposure box.
Figure 5:
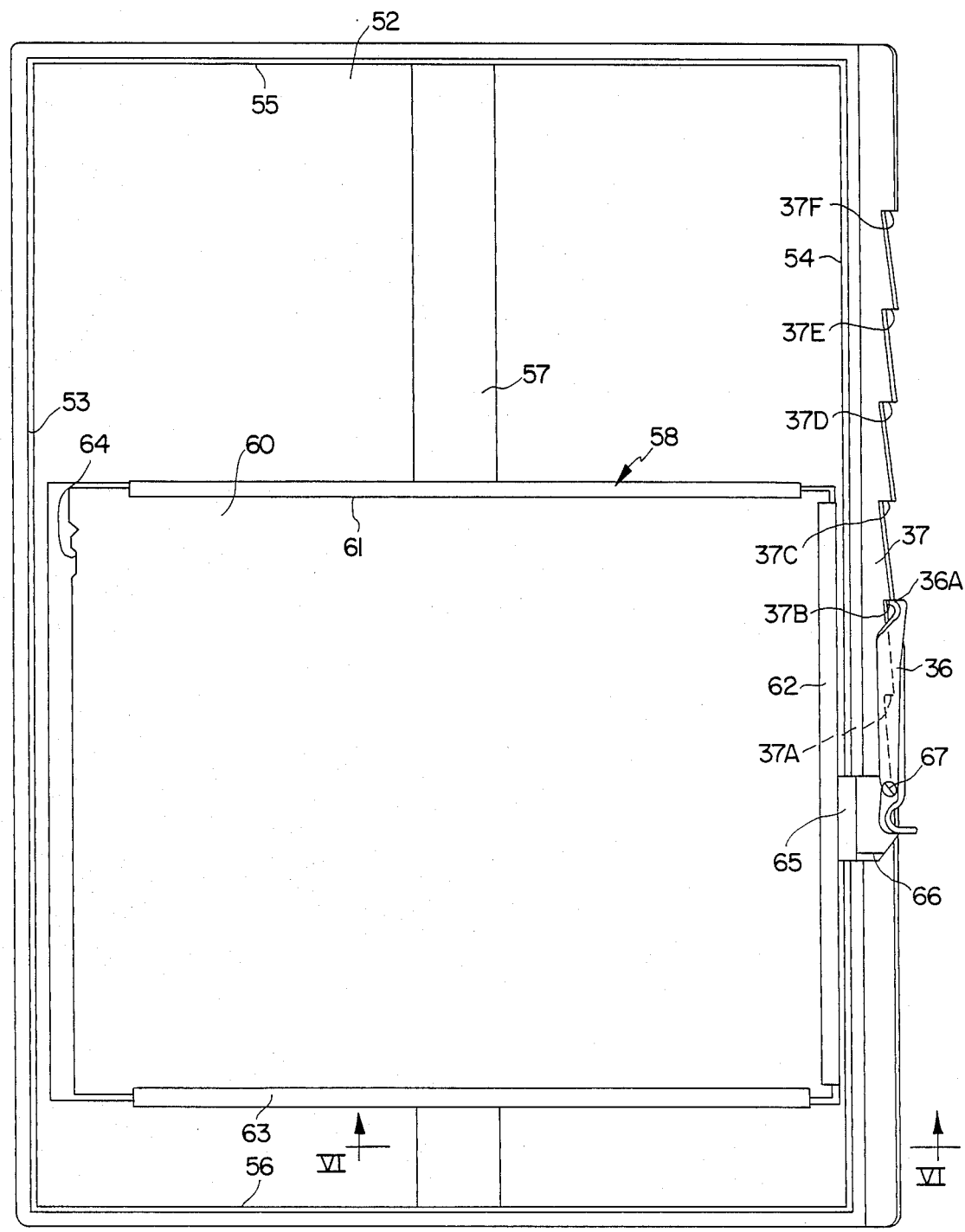
FIG. 5 is a top plan view similar to FIG. 4, but showing the bottom of the box with an internegative holder and film positioned thereon.

FIG. 4 is a top plan view of a base 50 of the box 10. Base 50 includes a bottom 52, upstanding side walls 53 and 54 and upstanding end walls 55 and 56, it being noted that the cover 33 is preferably formed with a depending peripheral skirt which extends on the outside of the side and end walls 53–56 of the bottom 52. A central upstanding guide 57 is disposed on the bottom 52 to extend from one end thereof to the other and to guide an internegative holder 58 for rectilinear movement between the end walls 55 and 56, a channel-shaped member 59 being disposed on the underside of the holder to receive the guide 57. An internegative 60 is shown in position in the holder 58 with three edge portions thereof being held by portions 61, 62 and 63 turned inwardly from edges of the holder 60 on its upper side. As shown, the internegative has a conventional notch 64 which can be felt in the dark to identify the orientation and type of film used. In a first series of six exposures, the notch 64 is at the left and away from the photographer, as shown. For a second series of six exposures, the internegative 60 is removed from the holder 58 and rotated 180 degrees in a clockwise or counter-clockwise direction about a vertical axis, to place the notch 64 at the right adjacent the side closest to the photographer. Thus six exposures are made on one side of a center line which is midway between the sides of the internegative 58 and six more exposures are made on the opposite side of the center line.

To support the aforementioned control member 36, a member 65 is formed to extend upwardly from one side of the holder 58 then over the top of the side wall 54, then downwardly along the outside of side wall 54 and on the inside of a depending skirt portion of the cover 33 and then angularly outwardly and upwardly to form an arm 66 on which the member 36 is pivotally supported by means of a screw 67. The aforementioned serrated member 37 projects angularly outwardly and upwardly from the lower edge of the side wall 54 and defines six stops 37A–37F engageable by a twisted pawl formation 36A at the end of member 36. In the arrangement as shown, the member is heavier on the pawl side, to be urged by gravity to the stop-engaging condition.

Figure 7:
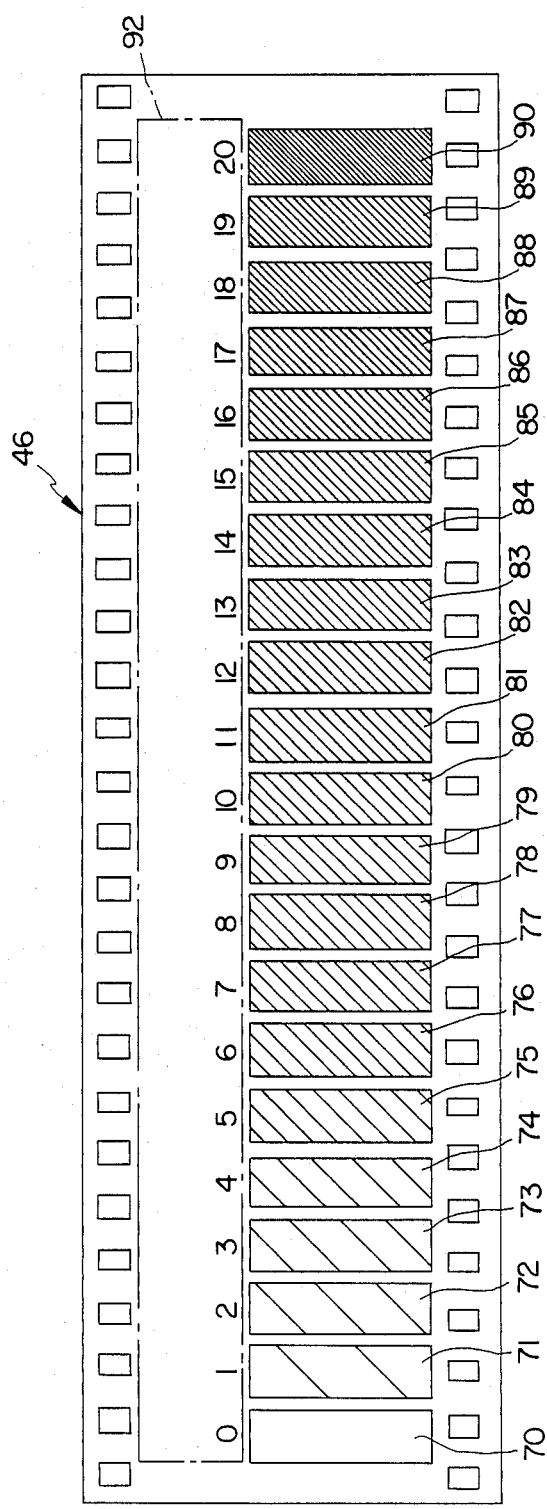
FIG. 7 is a plan view of a gray scale of the invention.

FIG. 7 is a plan view of the gray scale 46 which is formed in accordance with the principles of the invention. The illustrated gray scale 46 is on a strip of color film of the same type as the film for which the internegative balancing is performed. For example, the film is Ektachrome film is when Ektachrome film is to be tested for internegative balance. As shown, a series of twenty-one rectangular areas or "steps" 70-90 are provided which are of progressively different densities, step 70 having the least density, and step 90 having the greatest density. Unlike gray scales of the prior art in which there is a uniform difference in density between adjacent steps, the densities of the steps of the gray scale 46 are such as to obtain a uniform difference in tone in a print obtained from an internegative which has been exposed to the gray scale and then developed. This feature and a method of producing a gray scale in accordance with the invention will be clarified by considering the following table:

| Step No. | Standard Practice Density | Results | | Gray Scale 46 Density | Difference |
|---|---|---|---|---|---|
| | | Strong | Weak | | |
| 0 | 0 | | | 0 | |
| | | | | | 0.15 |
| 1 | 0.15 | | | 0.15 | |
| | | ** | | | 0.13 |
| 2 | 0.30 | | | 0.28 | |
| | | ** | | | 0.13 |
| 3 | 0.45 | | | 0.41 | |
| | | ** | | | 0.13 |
| 4 | 0.60 | | | 0.54 | |
| | | ** | | | 0.13 |
| 5 | 0.75 | | | 0.67 | |
| | | | * | | 0.16 |
| 6 | 0.90 | | | 0.83 | |
| | | | | | 0.15 |
| 7 | 1.05 | | | 0.98 | |
| | | | | | 0.15 |
| 8 | 1.20 | | | 1.13 | |
| | | ** | | | 0.13 |
| 9 | 1.35 | | | 1.26 | |
| | | | | | 0.15 |
| 10 | 1.50 | | | 1.41 | |
| | | ** | | | 0.13 |
| 11 | 1.65 | | | 1.54 | |
| | | ** | | | 0.13 |
| 12 | 1.80 | | | 1.67 | |
| | | | ** | | 0.17 |
| 13 | 1.95 | | | 1.84 | |
| | | | * | | 0.16 |
| 14 | 2.10 | | | 2.0 | |
| | | | ** | | 0.17 |
| 15 | 2.25 | | | 2.17 | |
| | | | * | | 0.16 |
| 16 | 2.40 | | | 2.33 | |
| | | | ** | | 0.17 |
| 17 | 2.55 | | | 2.50 | |
| | | | * | | 0.16 |
| 18 | 2.70 | | | 2.66 | |
| | | | * | | 0.17 |
| 19 | 2.85 | | | 2.83 | |
| | | | * | | 0.17 |
| 20 | 3.00 | | | 3.00 | |

In producing this table, a gray scale was tested in which the density differences from one step to another were uniform in accordance with standard practice. After exposure, developing and printing of an internegative, a visual examination of the print revealed a strong difference in hue between certain steps, mildly weak differences in hue between other steps, very weak differences in hue between still other steps and average differences in the remaining cases. For example, an average difference was observed between steps 0 and 1, strong differences were observed between steps 1 and 2, steps 2 and 3, steps 3 and 4 and steps 4 and 5 as indicated by double asterisks in the "Strong" column, a mildly weak difference was observed between steps 5 and 6 as indicated by a single asterisk in the "Weak" column and a very weak difference was observed between steps 13 and 14 as indicated by a double asterisk in the "Weak" column.

After the test with standard density differences, a scale was then prepared in which the density difference between steps was reduced by a factor of 0.02 where strong differences had been observed, in which the density difference between steps was increased by 0.01 where mildly weak differences had been observed and by 0.02 where very weak differences had been observed, but with the total density difference from step 0 to step 20 being the same. With the scale so prepared, a much more uniform tonal difference between steps is obtained from one end of the print of the scale to the other.

It should be understood that the values given in the table are representative and that they will vary in accordance with the characteristics of the particular film to be used for the gray scale. In any case, the test procedure as outlined may be used to obtain the desired tonal differences from one end of the scale to the other.

Indicia are provided on the gray scale 46 to identify the steps and the type of film and provisions are also made for recording the color filtrations used in the twelve exposures of the internegative through the gray scale 46. As shown, numerals 0-20 and indicia including the type of film are provided in a rectangular area 92 which is indicated by broken lines and which is between the row of sprocket holes on one side of the film 69 and one side of the area of steps 70-90. The opposite side of the area of steps 70-90 is adjacent the sprocket holes on the opposite side of the film 69. The opening 40 in the cover 33 has a size and is so positioned relative to a gray scale in the holder 42 that only the portion of the internegative which is below the area of steps 70-90 and the area 92, i.e., the region between the sprocket holes, is exposed. However, the movement of the internegative holder from one position to another is substantially greater than the distance between the sprocket holes with the result that areas are provided for the application of indicia of filtration values to an internegative after development thereof, using a silver marker pencil or the like.

Figure 6:
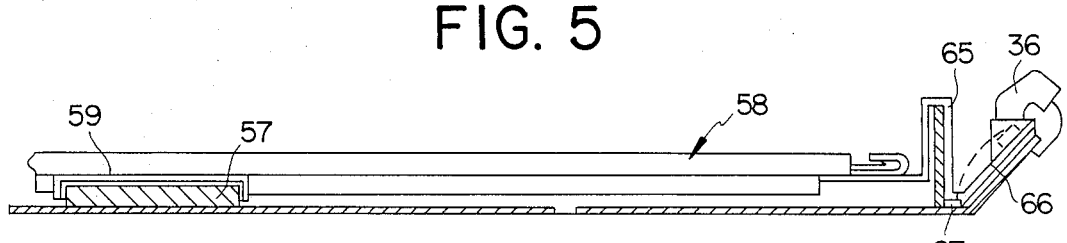
FIG. 6 is a sectional view, taken substantially along line VI—VI of FIG. 5 and on an enlarged scale as compared to that of FIG. 5.
Figure 8:
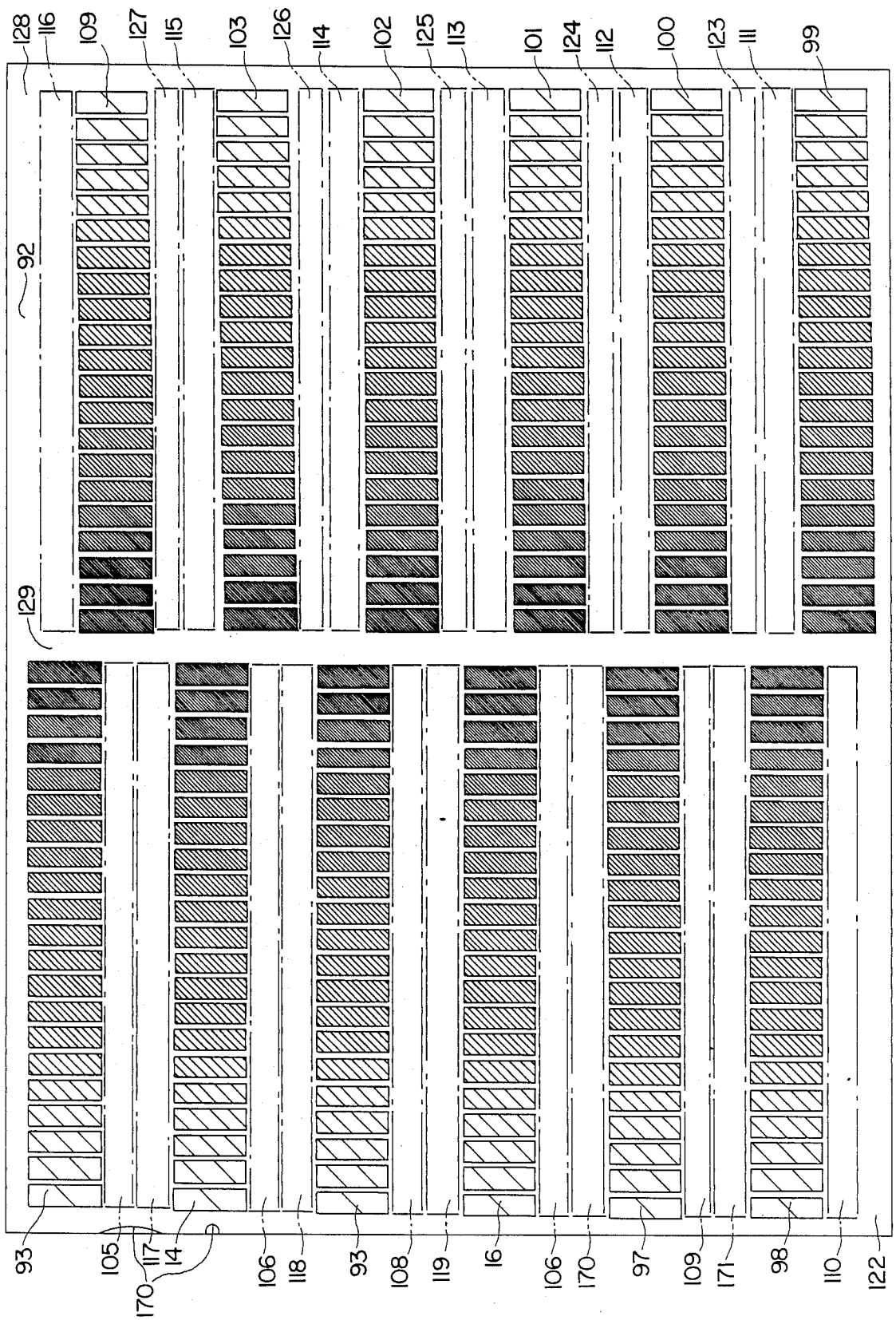
FIG. 8 shows the form of an internegative after exposure and in accordance with the invention.

The form of an internegative 92, with twelve negative gray scale reproductions 93-104, is indicated in FIG. 8. Twelve indicia areas 105-116, indicated in broken lines, contain twelve negative reproductions of the indicia area 92. The actual form of such negative reproductions is not shown but it will be understood that they are opaque except for transparent indicia corresponding to the opaque indicia within area 92 as shown in FIG. 6. In addition twelve transparent areas 117-128 are provided in adjacent relation to the indicia areas 105-116, for receiving the color filtration indicia which is applied using a silver marker pencil or the like. The current date and other indicia may also be applied in a central area 129.

Figure 9:
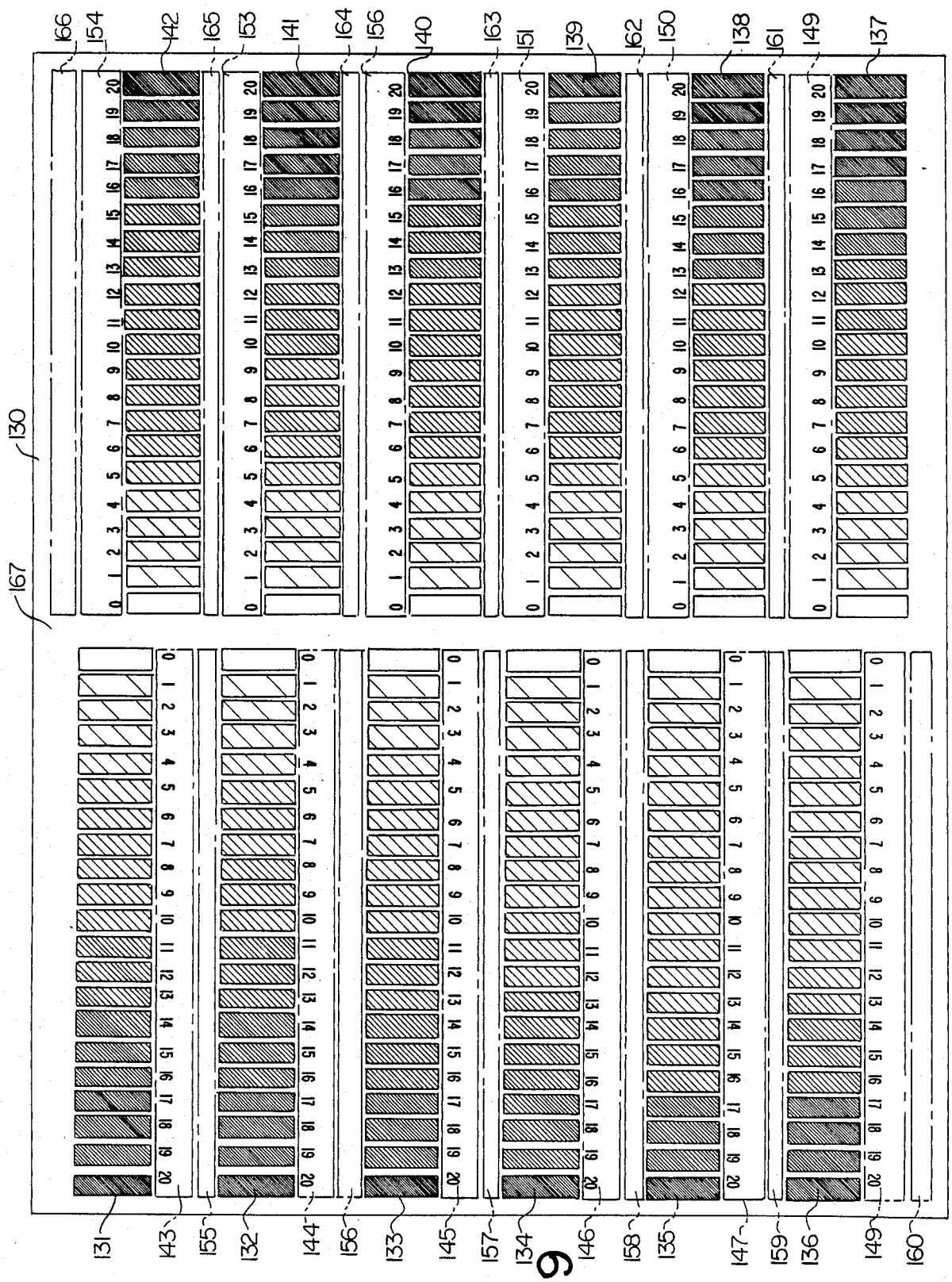
FIG. 9 shows the form of a print obtained from the internegative of FIG. 8.

The form of a print 130 of the internegative 92, with twelve positive gray scale reproductions 131-142, is indicated in FIG. 9. Twelve indicia areas 143-154 correspond to areas 105-116 and they contain twelve positive reproductions of the indicia area 92. Also twelve areas 155-166 correspond to areas 117-128 and a central area 167 corresponds to the date area 129. The actual form is not shown but it will be understood that areas 155–167 are black except for white or nearly white color filtration indicia resulting from the opaque color filtration applied to the internegative using a silver marker pencil or the like.

Figure 10:
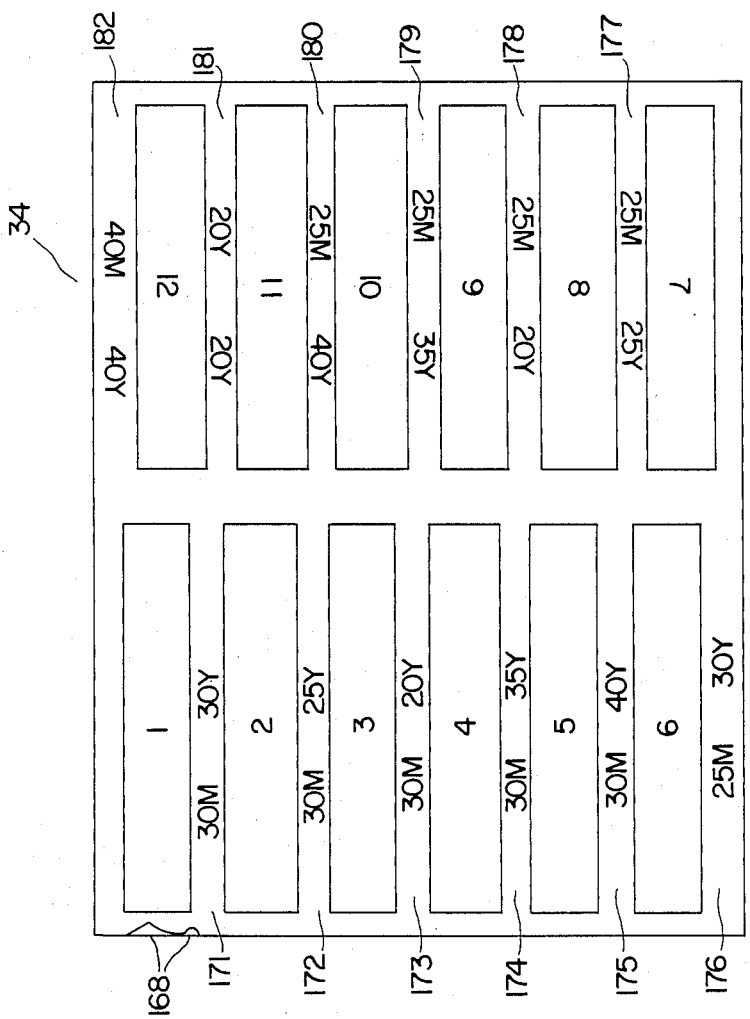
FIG. 10 shows a plan sheet of the inventions.

FIG. 10 shows the form of the plan sheet 34 which bears indicia 168 at one corner portion, having a form like that of identifying notch of a standard internegative, indicated by reference numeral 170 in FIG. 8. The plan sheet is initially positioned with the indicia 168 at the upper left and when initially positioning the internegative in the holder 58, the notch 170 is located by feel and it is also positioned at the upper left. Then after six exposures, the plan sheet is rotated 180 degrees to position the indicia 168 at the lower right while the internegative is also rotated 180 degrees to position the notch 170 at the lower right. The plan sheet 34 has twelve rectangular areas numbered 1–12 and having positional relationships to the indicia 168 which corresponds to the positional relationships of the negative gray scale reproductions 93–104 to the notch 170. Areas 171–172 are provided in adjacent relation to such rectangles for application of indicia of the color filtration values selected for exposure of the internegative. Typical exemplary color filtration values are shown on the illustrated plan sheet and it will be understood that such values will be entered on the internegative after it is developed, to be reproduced on any print obtained therefrom.

It will be appreciated that this arrangement makes it easy to select the color filtration values, expose the internegative in accordance therewith and obtain an accurate permanent record of the color filtrations used and date or other identifying indicia, both on the internegative and on any print obtained therefrom, with the possibility of errors being minimized. The keeping of permanent records is important for reference purposes, in keeping track of the internegative performance and in making improvements in the quality of color balancing. It is particularly desirable because of the ease with which the gray scale reproductions can be visually examined.

In addition to determination and control of color filtration values, the methods, apparatus, gray scales and plan sheet of the invention are usable in determination of the extent of contrast control of an internegative, by varying of the exposure. Ten-second test exposures are for average contrast. Certain standards of color printing may require greater or lesser contrasts of internegatives. After securing the optimal color balance at a ten-second exposure, it is desirable to further test by using the same color balance but with variations of exposure times. Standard practical limits of exposure parameters are limited to a range of from one-half to two times exposure. With the invention, these amounts, as well as others, can easily be tested on one sheet of film to determine contrasts most fitting to the equipment or situation. The invention can also be used to define contrasts best fitting original chromes for securing optimum results.

It will be understood that modifications and variations may be effected without departing from the spirit and scope of the novel concepts of this invention.

I claim:

1. Apparatus for color balancing of internegatives which will be subsequently used to print as positive on color printing paper or film, comprising: an enclosure including a top wall having a generally rectangular opening therein, a door on said top wall movable from a closed position over said opening to an open position to allow light having a selected filtration to pass through said opening, a gray scale holder for supporting below said opening a section of developed 35 mm color film which forms a gray scale having a series of portions forming steps with densities changing progressively from a certain minimum density to a certain maximum density and with the differences in density from one step to another being such as to produce a uniform tonal difference throughout the full range of steps on a positive test reproduction of the gray scale, and an internegative holder for supporting an internegative below and in close proximity to said section of developed 35 mm color film which forms said gray scale and for movement to allow sequential exposure of a series of selected progressively different filtrations on to separate portions of the internegative, support means in said enclosure for positioning said internegative holder for movement in a certain path relative to said enclosure, and means for controlling movement of said internegative holder to accurately establish a number of predetermined positions of said holder relative to said enclosure such that each exposed portion is isolated from the other exposed portions and while allowing a maximum number of exposures to be made on the internegative, whereby after completion of said exposures the internegative is developed and can be visually observed as a positive on a video color analyzer or on prints made on color paper or film thereby producing a visual examination capability of the most suitable color balance for the internegative.

2. Apparatus as defined in claim 1, wherein said support means is arranged to support the internegative for rectilinear movement in a certain path to expose a series of portions in side-by-side relation.

3. Apparatus as defined in claim 2, wherein said support means so support said internegative holder that the internegative is movable rectilinearly for sequential exposure of one series of portions along one-half of the internegative and after which the internegative is again movable rectilinearly for sequential exposures of a series of portions along the other half thereof.

4. Apparatus as defined in claim 1, wherein said predetermined positions of said holder are such that spaces are provided between exposed portions of the internegative for application of filtration value indicia to the internegative after development thereof.

5. Apparatus as defined in claim 1, including means on said enclosure for supporting a plan sheet having indicia thereon corresponding to said exposed portions and so arranged as to facilitate application thereto of indicia of color filtration values used in the sequential exposures.

6. Apparatus as defined in claim 5, wherein said indicia on said plan sheet represent the positions of the exposed portions and are in the same positional relationship and orientation as the exposed portions.

7. Apparatus as defined in claim 1, wherein said support means so support said internegative holder that the internegative is movable rectilinearly for sequential exposure of one series of portions along one-half of the internegative and wherein the internegative is thereafter manually rotatable relative to said holder with said holder then being again movable rectilinearly for sequential exposures of a series of portions along the other half of said internegative.

8. Apparatus as defined in claim 7, including means on said enclosure for supporting a plan sheet for application thereto of indicia of color filtration values used in the sequential exposures, wherein said plan sheet has indicia thereon representing the positions of the exposed portions and in the same positional relationship and orientation as the exposed portions.

* * * * *